455-296 SR
FIP8106 XR 3,812,289
CROSS REFERENCE

United State
Avins

[11] 3,812,289
[45] May 21, 1974

[54] TELEVISION RECEIVER USING SYNCHRONOUS VIDEO DETECTION

[75] Inventor: Jack Avins, Princeton, N.J.

[73] Assignee: RCA Corporation, New York, N.Y.

[22] Filed: Nov. 6, 1972

[21] Appl. No.: 303,797

[52] U.S. Cl... 178/7.3 R, 178/DIG. 12, 178/5.4 SD, 325/473

[51] Int. Cl. .......... H04n 5/44

[58] Field of Search..... 178/7.3 R, 5.4 SD, DIG. 12, 178/7.3 S, 7.5 S; 325/65, 473–478

[56] References Cited

UNITED STATES PATENTS

| | | | |
|---|---|---|---|
| 2,717,920 | 9/1955 | Avins | 325/473 |
| 3,750,029 | 7/1973 | Baars | 178/7.3 R |
| 3,144,512 | 8/1964 | McAllan et al. | 178/7.3 R |
| 3,697,685 | 10/1972 | Lunn | 178/7.3 R |
| 3,441,669 | 4/1969 | Janson et al. | 178/DIG. 12 |
| 3,256,502 | 6/1966 | Momberger | 178/DIG. 12 |
| 2,861,180 | 11/1958 | Sonnenfeldt | 178/7.3 R |

*Primary Examiner*—Robert L. Richardson
*Assistant Examiner*—Jin F. Ng
*Attorney, Agent, or Firm*—Eugene M. Whitacre; Mason DeCamillis

[57] ABSTRACT

Synchronous video detection in a television receiver provides increased detection linearity and better signal-to-noise ratio for weak signals than does envelope video detection. Impulse noise, which produces generally unobtrusive black-going noise in a kinescope picture produced in accordance with a video signal recovered by envelope detection, conventionally produces obtrusive white-going noise as well in a picture produced in accordance with a video signal recovered by synchronous detection. Impulse noise detected by an auxiliary video detector responsive to the video i-f envelope provides a blanking signal to remove obtrusive white noise from the output signal of a synchronous video detector.

8 Claims, 9 Drawing Figures

Figure 1:
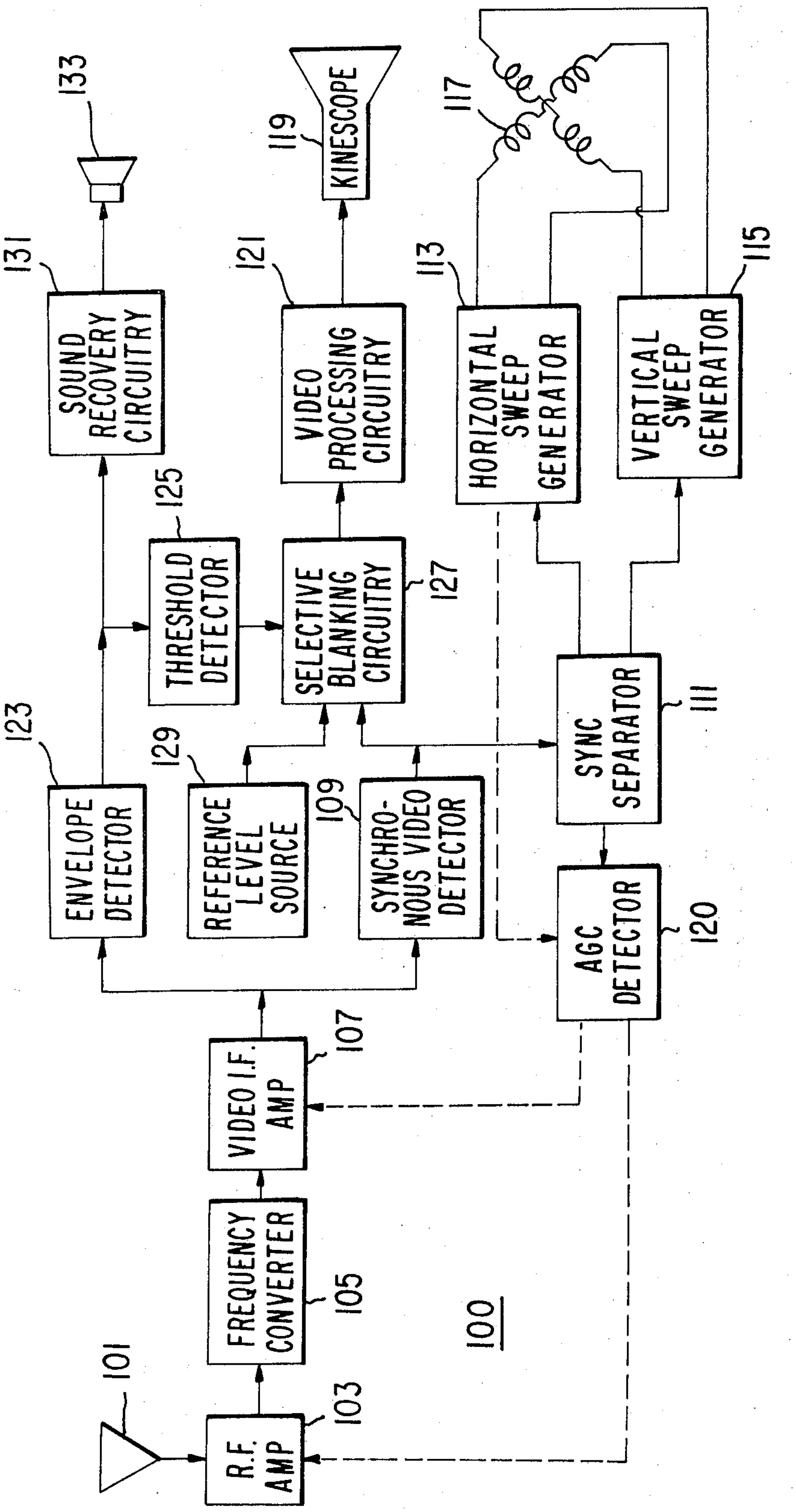

3812289
OR IN 358/167

TELEVISION RECEIVER USING SYNCHRONOUS VIDEO DETECTION

The present invention relates to synchronous detection apparatus for use in the video detector of a television receiver and more particularly to apparatus for removing undesired responses to impulse noise accompanying the television signals, which responses otherwise appear in the output signals from the detector.

Synchronous detectors of either the exalted carrier or product detector type are well-known to offer improved detection linearity, freedom from cross modulation and noise immunity as compared to envelope detectors and have consequently been proposed for video detectors in television receivers. The problem of 920 KHz beat between sound and chroma subcarriers and "herringbone" beats between sound and picture information appearing in the luminance signal and consequently in the picture can be reduced by using a synchronous video detector. The less stringent filter requirements to avoid 920 KHz beat permits better phase response in the video i-f amplifier chain, which in turn permits better transient response in the chrominance demodulator and amplifier system of a color television receiver.

The behavior of the synchronous video detector during the reception of impulse noise is less desirable than that of an envelope detector. The envelope video detector rectifies the peaks of impulse noise to provide black-going spurious signals which generally are considered unobtrusive by the viewer. The synchronous video detector does not rectify impulse noise; the impulse noise is detected as a spurious midband component, concentrated around 2 MHz, which is alternately black-going and white-going. The white-going portions of these spurious noise components are generally considered to be substantially more objectionable to the viewer than the black-going components. Also whiter-than-white signal peaks due to synchronous detection of impulse noise can cause "blooming" in which the electron beam defocuses, increasing the size of the whiter-than-white spots in the scene.

U.S. Pat. No. 2,861,180 describes the underlying principle used to eliminate white-going impulse noise in prior synchronous video detection schemes. Whiter-than-white video signal developed at the output of the synchronous video detector is detected and the video signal altered to remove the whiter-than-white component. In the cited patent, the video signal is altered by clipping off its whiter-than-white portions. The methods of detecting whiter-than-white noise and inverting it to black used in British television practice, where positive modulation is employed and envelope video detectors exhibit whiter-than-white impulse noise, can be adapted for use with synchronous video detectors.

However, detecting whiter-than-white noise directly and inverting such noise to black has problems associated therewith. Thermal noise variations in the modulating carrier waves being detected must not be permitted to exceed the threshold of detection very often during predominantly white information or it will be objectionally peppered with small black spots. The threshold detector in such a system will have a whiter-than-white threshold. Signals which go whiter than the threshold will be inverted to black. If the threshold level be close to white level, during predominantly white information thermal noise will cause a frequent whiter-than-threshold condition, in consequence of which the video signal is undesirably frequently inverted to cause the peppering. Adjusting the threshold even whiter to avoid peppering undesirably impairs the effectiveness of the system for noise which is slightly whiter-than-white, which accompanies stronger television signals. Better television receivers of this type will provide a detection threshold which is automatically adjusted according to signal strength.

The present invention is embodied in a detector to provide improved demodulation of carrier waves bearing intelligence encoded in amplitude modulation thereof as provided from a source, which carrier waves are likely to be accompanied by and contaminated with impulse noise. First and second amplitude modulation detectors having their input circuits coupled to said source, provide first and second recovered intelligences in their respective output circuits. The first amplitude modulation detector responds to impulse noise to provide from its output circuit a first spurious signal at least portions of which are in a first polarity as referred to that of the first recovered intelligence therein. The second amplitude modulation detector responds to impulse noise to provide a second spurious signal from its output circuit, which second spurious signal is of a second polarity as referred to that of the second recovered intelligence therein, said second polarity being opposite to said first polarity. A means for selectively coupling first recovered intelligence from the output circuit of the first amplitude modulation detector to utilization means responds to whether said second spurious signal exceed in the second polarity a predetermined threshold level or not respectively to not provide coupling and to provide coupling.

Figure 2A:
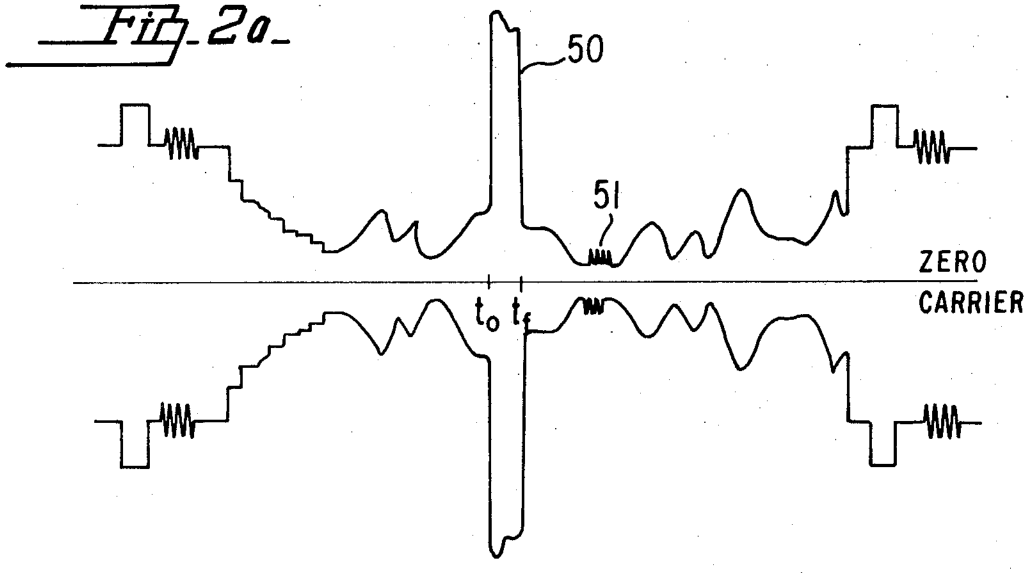
Figure 2B:
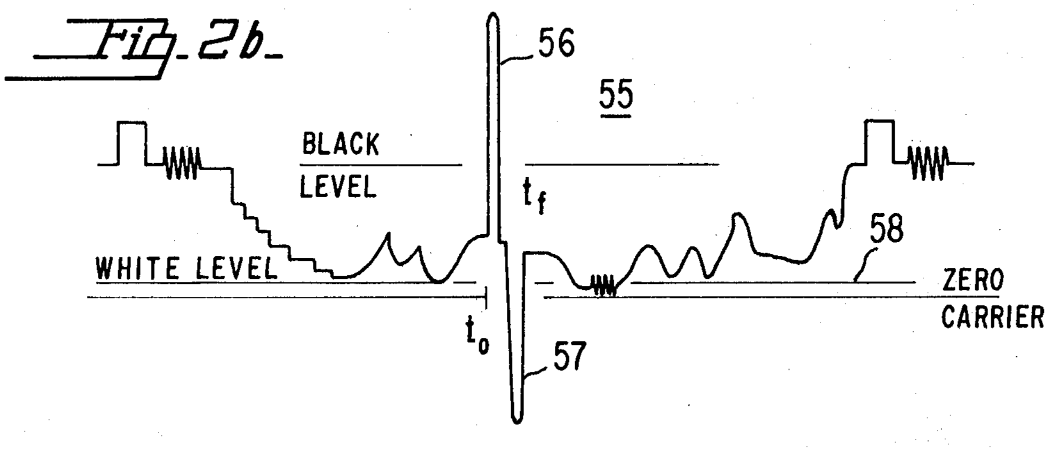
Figure 2C:
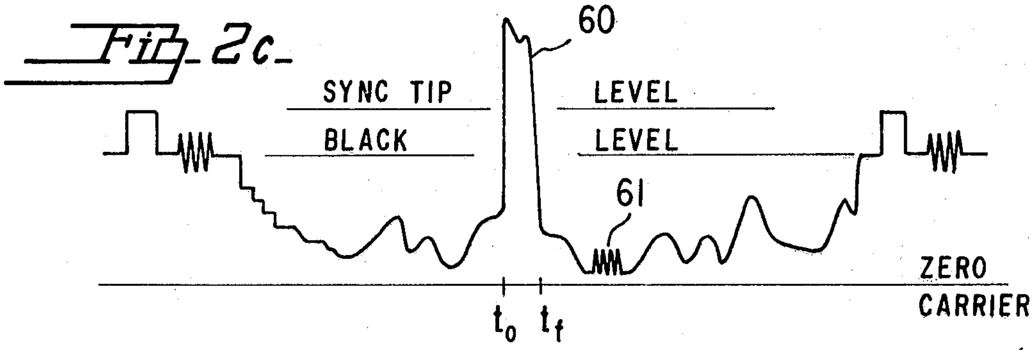
Figures 2D, 2E, 2F, 2G:
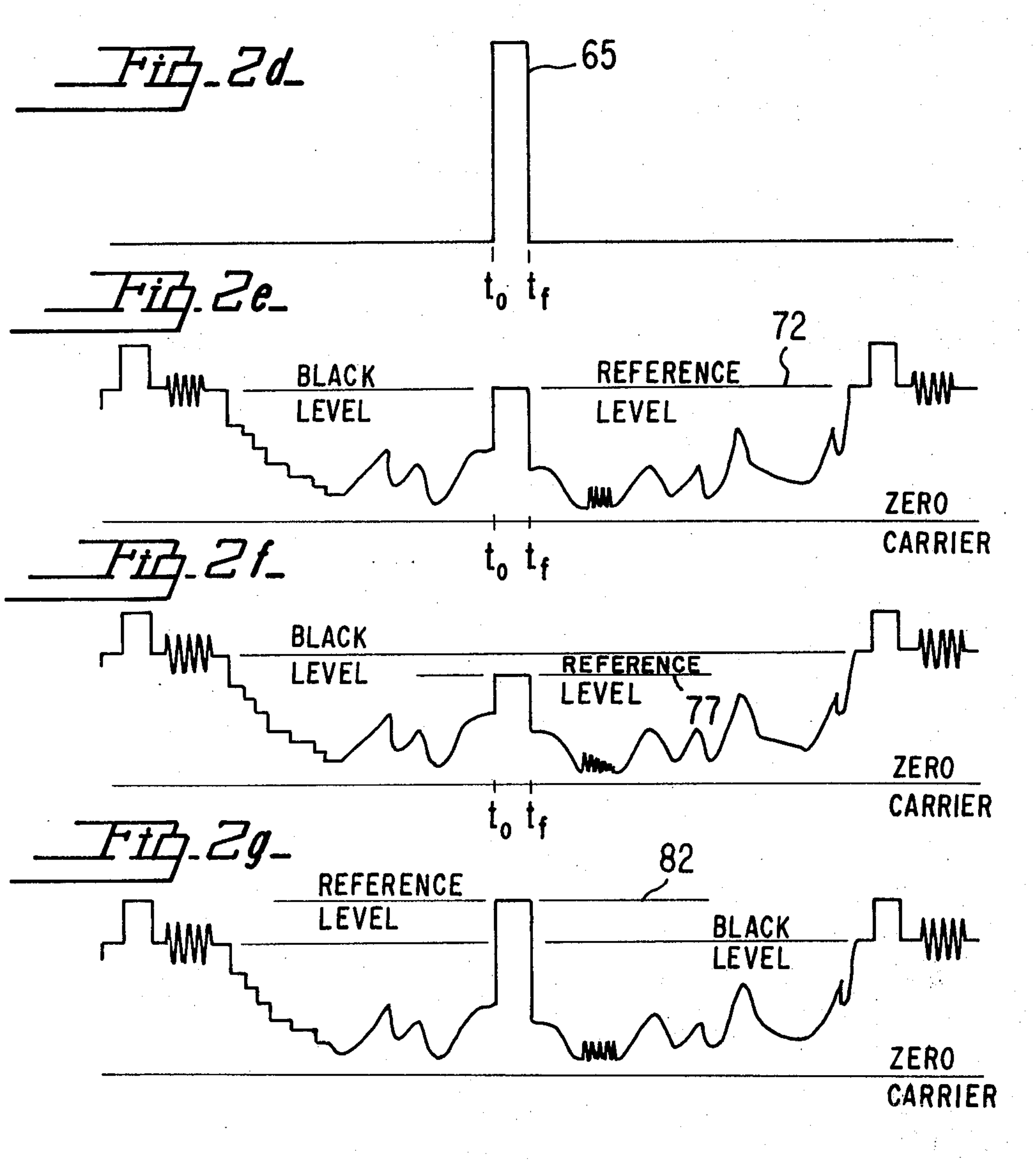
Figure 3:
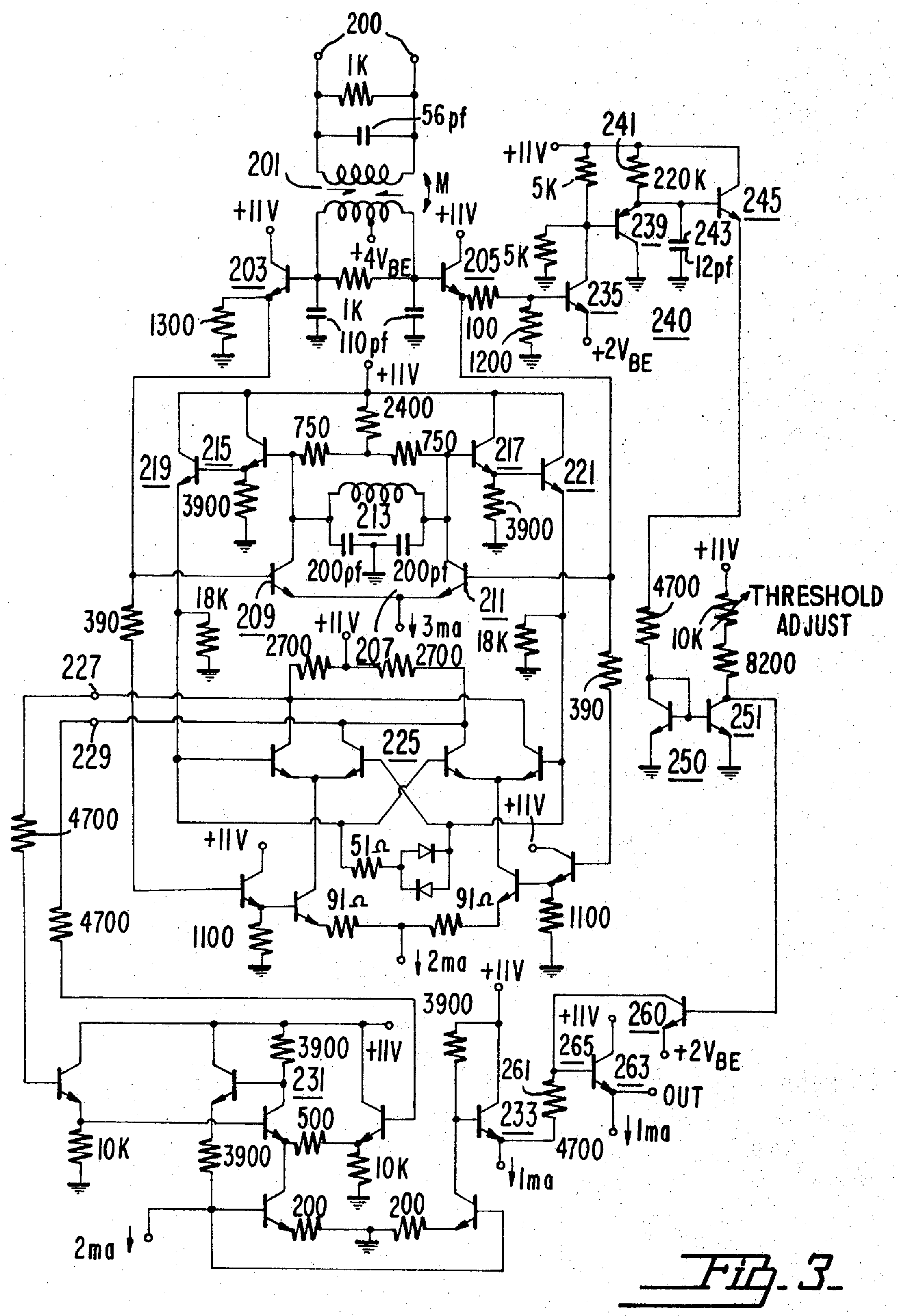

The present invention will be better understood by reference to the accompanying drawing and the following explanation thereof, in which drawing:

FIG. 1 is a schematic circuit diagram, in block form, of a television receiver embodying the present invention;

FIGS. 2*a*–2*g* is a timing diagram of waveforms in the television receiver shown in FIG. 1 and FIG. 3 is a schematic circuit diagram of a video detector system embodying the present invention.

Referring now to FIG. 1 the television receiver 100 has an antenna 101 to intercept broadcast television signals, which are then processed by a radiofrequency amplifier 103, a frequency converter 105 typically comprising a mixer and local oscillator combination, and a video i-f amplifier 107 to provide composite video signal carrier waves to be detected to the synchronous video detector 109. The composite video signal detected by the detector 109 is supplied to a sync separator 111. The sync separator 111 responds to supply separated horizontal and vertical sync pulses respectively to the horizontal sweep generator 113 and the vertical sweep generator 115 to time their sweep waveforms to be properly timed with respect to the received television signals. The sweep waveforms are applied to horizontal and vertical deflection coils 117 associated with a kinescope 119. The sync separator 111 also supplies separated sync to automatic gain control (AGC) circuitry 120 which controls the gains of the amplifiers 103, 107 to maintain the sensitivity of the detector 109 to received television signals relatively constant. The output circuit of synchronous detector 109 is coupled to the input circuit of video processing circuitry 121 preceding the kinescope 119. The video processing circuitry 121 typically includes the luminance channel amplifiers and in a color receiver will also include chrominance detector and amplifier circuitry. The illustrated receiver 100 includes an envelope detector 123 which functions as an auxiliary video detector of carrier waves provided by the intermediate-frequency amplifier 107. The composite video signal from the envelope detector 123 is applied to the input circuit of a threshold detector 125. Threshold detector 125 senses excursions in this composite video signal which are blacker than a threshold level set at black level or a blacker-than-black level of the video signal and responds to provide a blanking signal to the selective blanking circuit 127.

The selective blanking circuit 127 operates as a switch to couple the output circuit of the synchronous video detector 109, or the output circuit of reference source 129 to the video processing circuitry 121. When threshold detector 125 does not apply a blanking signal the selective blanking circuit 127 couples the output of synchronous video detector 109 to the video processing circuitry 121. When the threshold detector 125 provides a blanking signal to the selective blanking circuit 127, the selective blanking circuit 127 decouples the output of synchronous video detector 109 from the input circuit of the video processing circuitry 121, and supplies to the input circuit of video processing circuitry 121 a predetermined reference level from a source 129 instead. This predetermined reference level in various embodiments of the present invention may be selected to be at a blacker-than-black, a black or a gray level with respect to the video signal into which it is interposed, so the subjective effect of the noise in the picture reproduced upon the kinescope (119) screen in response to the modified video signal is less objectionable than the response to a video signal in which the whiter-than-white condition is permitted to exist.

In the absence of impulse noise, the selective blanking circuit 127 couples the detected video signal provided from the synchronous video detector 109 to the video processing circuitry 121; and the receiver 100 operates like prior receivers employing synchronous video detection.

When impulse noise accompanies the carrier waves provided by the intermediate-frequency amplifier 107 to detectors 109 and 123, the synchronous video detector 109 responds with a detected video signal which swings whiter-than-white. The envelope detector 123 will simultaneously respond to provide a blacker-than-black detected video signal, which causes the threshold detector 125 to supply blanking signals to the selective blanking circuit 127. The predetermined video level provided by the source 129 rather than the whiter-than-white detected video signal output of the synchronous video detector 109 will then be applied to the input circuit of the video processing circuitry 121.

FIG. 2 illustrates the waveforms provided at various points in the television receiver shown in block schematic in FIG. 1.

FIG. 2*a* shows a typical horizontal line interval of the modulated video i-f carrier wave as provided by the video i-f amplifier 107 to detectors 109, 123. The envelopes of this modulated carrier wave are indicated in outline, the actual variations of carrier wave being omitted since they occur at too high a rate to be clearly represented upon the time scale shown. A noise impulse 50 occurs between times $t_o$ and $t_f$. The time scale in these waveforms has been stretched for the duration of the noise impulse to provide clarity of illustration.

FIG. 2*b* shows the response of the synchronous detector 109 to the modulated video i-f carrier wave shown in FIG. 2*a*. The noise impulse 50 gives rise to what is shown as a doublet 55 having a black-going portion 56 and a white-going portion 57. Noise pulses of longer duration will cause multiple ringing in the response of detector 109. The whiter-than-white portion 57 swinging below white level 58 causes obtrusive noise.

FIG. 2*c* shows the response of the envelope detector 123 to the modulated video i-f carrier wave shown in FIG. 2*a*. The noise impulse 50 is rectified to provide a black-going impulse without appreciable white-going portions. This impulse is supplied to the threshold detector 125 which has a threshold level set at black level or a blacker-than-black level.

FIG. 2d shows the blanking signal pulse 65 produced by the threshold detector when its threshold is exceeded by the black-going impulse 60.

FIG. 2e shows a video signal as may be supplied from the selective blanking circuit 127. The waveform resembles that of FIG. 2b showing the output of the synchronous detector 109 except that during the interval between times $t_o$ and $t_f$ the signal is at a reference level 72, which is black level. FIG. 2*f* shows the video signal as supplied from the selective blanking circuit 127 when the reference level 77 to which the signal is referred during the interval between times $t_o$ and $t_f$ is at a gray level. FIG. 2*g* shows the video signal at the output of the selective blanking circuit 127 when the reference level 82 is placed at a blacker-than-black level.

In the receiver 100 shown in FIG. 1 predominantly white information is far from the threshold level of the threshold detector 125, which threshold level is at black or a blacker-than-black level. The presence of thermal noise at white level will not suffice to cause the threshold detector 125 to provide a blanking signal. This is illustrated in FIGS. 2*a* and 2*c*. The thermal noise 51 during a white portion of the video i-f carrier wave shown in FIG. 2*a* causes the detected thermal noise 61 in the output signal of the envelope detector 123 shown in FIG. 2*c*, which is far below the threshold detector level located at black level or a blacker-than-black level. During predominantly black information thermal noise may cause the threshold detector 125 to provide a blanking signal. However, if the predetermined video level from the source 129 be close to black, the effect of such blanking on the picture is not very noticeable.

Since white-going noise is more visible during predominantly black information, it is desirable that the threshold detector initiating video signal correction work with minimum delay during predominantly black information. Having the threshold detector threshold level as per the present invention relatively close to black level, rather than close to white level, facilitates detection of impulse disturbances during predominantly black information since only a relatively small increase in noise is required to reach the threshold. Accordingly, television receivers embodying the present invention are free of white noise in black areas of the picture.

The use of separate envelope detector 123 and threshold detector 125 as shown in FIG. 1 permits the sound recovery circuitry 131 providing the loudspeaker 133 with audio frequency signals to be supplied sound i-f carrier waves from the envelope detector 123. This is particularly advantageous to do when the video detector 109 is the type of synchronous detector which employs an oscillator synchronized to incoming signal with an automatic phase and frequency control. A synchronous detector of such type will produce an annoying heterodyne whistle in the loudspeaker 133 during the acquisition or loss of synchronism with incoming composite video carrier waves, a shortcoming not found in an envelope detector (such as 123).

An exalted-carrier type of synchronous detector 109 which recovers unmodulated carrier wave by limiting and filtering the modulated video i-f carrier wave can supply modulated sound carrier waves to the sound recovery circuitry 131 without incurring the previously noted heterodyne whistle problem. In such a television receiver the envelope detector 123 and threshold detector 125 may be provided by the same circuitry, by adjusting bias levels on the envelope detector 123 so it responds only to excursions of the video i-f carrier waves which exceed a certain threshold level.

FIG. 3 shows an embodiment of the present invention using a synchronous detector wherein the modulated carrier waves are limited and then bandpass filtered to extract unmodulated carrier waves, after which the modulated carrier waves are product detected against the unmodulated carrier waves. Video i-f signals applied between input terminals 200 are coupled via a double-tuned transformer input circuit 201 to the base electrodes of emitter-follower transistors 203, 205.

The anti-phase video i-f signals at the emitter electrodes of transistors 203, 205 are applied to an emitter-coupled differential amplifier 207 incorporating transistors 209 and 211. Bandpass filter 213, tuned to video carrier frequency provides an output circuit for the amplifier 207 and filters the limited carrier waves to select video carrier waves to be applied in anti-phase at the base electrodes of emitter-follower transistors 215, 217. These anti-phase carrier waves are coupled through cascaded emitter-follower transistors 215, 219 and 217, 221, respectively to appear at the emitter electrodes of transistors 219 and 221, respectively, which supply switching signal to the product detector 225.

The product detector 225 which is used as the synchronous video detector is also supplied anti-phase video i-f signals — that is, modulated video carrier waves — from the emitter electrodes of transistors 203, 205, respectively. Demodulated composite video signals appear in balanced form between output terminals 227, 229 of the product detector 225, and are applied to an electronic balun circuit 231, of the sort described in U.S. Pat. No. 3,641,448, which combines the balanced composite video signals to provide a single-ended composite video signal to the base electrode of transistor 233.

The circuitry of FIG. 3 thus far described provides the synchronous video detector. Video i-f carrier waves from the emitter electrode of transistor 205 are also coupled to the base electrode of a commonemitter amplifier transistor 235. The collector electrode of transistor 235 provides amplified video i-f carrier waves to the base electrode of transistor 239, the base-emitter semiconductor junction of which is the rectifier element in the envelope detector 240. Resistor 241 couples the emitter electrode of transistor 239 to +11 volt reference voltage. The capacitor 243 and the collector-to-base capacitance of transistor 245 together with the resistor 241 integrate the detected video signal and remove carrier wave remnants.

This detected information is coupled via the emitter follower action of transistor 245 to an inverting amplifier 250 with unity current gain and of the sort described in U.S. Pat. No. 3,531,730. The collector load of the output transistor 251 of the inverting amplifier 250 includes a variable resistance (THRESHOLD ADJUST) which permits adjustment of the quiescent potential at the junction of its collector electrode and the base electrode of transistor 260.

Transistor 260 is the threshold detector, clamping the potential at its collector electrode to its emitter potential when the video signal detected by the envelope detector 240 as coupled to its base electrode via inverting amplifier 250 becomes large enough to forward bias its base-emitter junction — that is, during noise impulse spikes. When the transistor 260 is in its normally non-conductive state, it exerts no influence on the video signal provided from the synchronous video detector portion of the circuit at the emitter electrode of transistor 233 and coupled via resistor 261 to the base electrode of emitter-follower output transistor 263. When the transistor 260 is conductive during impulse noise the base potential of transistor 263 is clamped to the +2 $V_{BE}$ potential at the emitter electrode of transistor 260. That is, the transistor 260 and resistor 261 provide a keyed clamping means 265 responsive to blanking signals provided from the envelope detector 240.

The selectively blanked video signal at the base electrode of transistor 263 is coupled by emitter follower action to the output terminal (OUT) connected to its emitter terminal.

As the illustrated circuit is used, the video signal is clamped to a dark shade of gray during impulse noise spikes. This permits the sync separator to be connected at the terminal OUT as well as the video processing circuitry, without the impulse noise selective blanking providing spurious synchronizing pulses to the sync separator. The sound recovery circuitry may also be connected to transistor 263 to receive frequency-modulated intercarrier sound information as a component of the signal available from the terminal OUT as well.

What is claimed is:

1. A detector for amplitude modulated signals comprising:

a source of carrier waves bearing intelligence encoded in amplitude modulation thereof accompanied by impulse noise;

a synchronous amplitude modulation detector having an input circuit coupled to said source, having an output circuit providing first recovered intelligence, and being responsive to impulse noise to provide from its said output circuit a first spurious signal at least portions of which are in a first polarity as referred to that of said first recovered intelligence, an envelope amplitude modulation detector having an input circuit coupled to said source, having an output circuit providing second recovered intelligence and being responsive to impulse noise to provide from its output circuit a second spurious signal which is in a second polarity as referred to that of said second recovered intelligence, said second polarity being opposite to said first polarity;

utilization means for said first recovered intelligence; and means selectively coupling said output circuit of said synchronous detector to said utilization means responsive to whether said second spurious signal exceeds in said second polarity a predetermined threshold level respectively to not provide coupling and to provide coupling of said first recovered intelligence to said utilization means.

2. A detector as defined in claim 1 wherein:

said source of carrier waves bearing intelligence provides video intermediate frequency signals to said synchronous and said envelope amplitude modulation detectors which respond with respective detected video signals, each including synchronizing pulse information and said utilization means further comprises a synchronizing signal separator circuit.

3. A detector as defined in claim 1 wherein:

said source of carrier waves bearing intelligence further provides a frequency-modulated component signal and said utilization means further comprises means for detecting that portion of said intelligence borne by said frequency-modulated component signal.

4. In a television receiver including a synchronous video detector detecting composite video signal carrier waves to provide video signals for application to video processing circuitry and to sync separation means, the improvement comprising:

auxiliary detector means to provide a blanking signal in response to excursions of the envelope of said composite video signal carrier waves which exceed a threshold value and blanking means interposed between said synchronous video detector and said video processing circuitry and responsive to said blanking signal to interrupt said application of said video signals to said video processing circuitry.

5. The improvement defined in claim 4 wherein:

said auxiliary detector means comprises an envelope detector having input terminals and output terminals, said composite video signal carrier waves being coupled to said input terminals;

a threshold detector having input and output terminals, said threshold detector input terminals being direct coupled to said envelope detector output terminals, said threshold detector output terminals being coupled to said blanking means to furnish said blanking signal; and sound recovery circuitry for said television receiver having an input signal circuit coupled to said envelope detector output terminals.

6. The improvement defined in claim 4 wherein said blanking means comprises:

a source of predetermined video level and an electrically controlled selector means having a first and a second sets of input terminals respectively coupled to said synchronous video detector and to said source of predetermined video level, having control terminals connected to receive said blanking signal and having output terminals coupled to said video processing circuitry and selectively coupled to said first set of input terminals in the absence of said blanking signal and coupled to said second set of input terminals in the presence of said blanking signal.

7. The improvement defined in claim 6 wherein:

said predetermined video level is no blacker-than-black level with respect to said video signals for application to video processing circuitry and said blanking means is interposed between said synchronous video detector and said sync separation means as well as between said synchronous video detector and said video processing circuitry.

8. The improvement defined in claim 4 wherein said blanking means comprises:

a source of predetermined video level and keyed clamping means for clamping said video signals for application to video processing circuitry to said predetermined video level in response to said blanking signal.

* * * * *